(12) United States Patent
Madewell

(10) Patent No.: US 7,154,433 B1
(45) Date of Patent: Dec. 26, 2006

(54) METHOD AND DEVICE FOR THE DETECTION AND TRACK OF TARGETS IN HIGH CLUTTER

(75) Inventor: J. Michael Madewell, Madison, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/830,805

(22) Filed: Apr. 21, 2004

Related U.S. Application Data

(62) Division of application No. 10/346,157, filed on Jan. 16, 2003, now Pat. No. 6,809,682.

(51) Int. Cl.
*G01S 13/52* (2006.01)
(52) U.S. Cl. .............. 342/160; 342/159; 342/175; 342/195; 342/196
(58) Field of Classification Search ........ 342/27, 342/28, 59, 73–81, 159–164, 175, 192–197, 342/82–103, 165–174
See application file for complete search history.

(56) References Cited

U.S. PATENT DOCUMENTS

| | | | |
|---|---|---|---|
| 3,382,496 A * | 5/1968 | Matsukasa et al. ........... 342/59 |
| 3,560,972 A | 2/1971 | Taylor, Jr. | |
| 3,631,488 A * | 12/1971 | Evans ........................ 342/162 |
| 3,946,382 A * | 3/1976 | Kossiakoff et al. ........... 342/93 |
| 4,137,532 A * | 1/1979 | Taylor et al. ................. 342/93 |
| 4,249,179 A * | 2/1981 | Kolacny ..................... 342/102 |
| 4,542,382 A * | 9/1985 | Hol ............................. 342/91 |
| 4,622,552 A * | 11/1986 | Andrews et al. ............ 342/196 |
| 4,661,816 A * | 4/1987 | Musha et al. ................. 342/91 |
| 4,684,950 A * | 8/1987 | Long ........................... 342/94 |
| 4,887,088 A * | 12/1989 | Beckett ........................ 342/159 |
| 5,191,337 A * | 3/1993 | Brovko et al. .............. 342/160 |

(Continued)

FOREIGN PATENT DOCUMENTS

JP 1-147388 A * 6/1989 ................. 342/172

OTHER PUBLICATIONS

Merrill I. Skolnik, "Introduction to Radar Systems", 1980, McGraw Hill, Inc., pp. 119-148 and pp. 369-396.

*Primary Examiner*—Bernarr E. Gregory
(74) *Attorney, Agent, or Firm*—U.S. Army Space and Missile Defense Command

(57) ABSTRACT

A method for discriminating and tracking a target in a clutter cloud includes transmitting a radar signal at a signal bandwidth to: identify a range extent of a clutter cloud; determine a centroid and a velocity growth rate of the clutter cloud; and identify a direction of movement of the centroid of the clutter cloud. The method may also include locking a another radar signal having a greater signal bandwidth onto the centroid of the clutter cloud whereby the centroid is tracked within one radar range resolution bin; providing a delay line that includes at least two Doppler filters and is configured to cover a Doppler frequency range corresponding to a velocity growth rate of the clutter cloud; and processing a reflected radar signal corresponding to the greater signal bandwidth. The processing of the reflected radar signal may comprise passing the reflected radar signal through the delay line to mitigate a portion of the reflected signal that is reflected by the clutter cloud. A system and apparatus for performing the method is also provided.

8 Claims, 8 Drawing Sheets

U.S. PATENT DOCUMENTS

| | | | |
|---|---|---|---|
| 5,418,536 A * | 5/1995 | Lisle et al. | 342/194 |
| 5,485,157 A * | 1/1996 | Long | 342/160 |
| 6,307,500 B1 * | 10/2001 | Cornman et al. | 342/192 |
| 6,677,886 B1 * | 1/2004 | Lok | 342/159 |
| 6,809,682 B1 * | 10/2004 | Madewell | 342/160 |

* cited by examiner

METHOD AND DEVICE FOR THE DETECTION AND TRACK OF TARGETS IN HIGH CLUTTER

CROSS REFERENCE TO RELATED APPLICATIONS

This is a division of U.S. patent application Ser. No. 10/346,157, entitled "Method and Device for the Detection and Track of Targets in High Clutter", filed Jan. 16, 2003, now U.S. Pat. No. 6,809,682.

BACKGROUND OF THE INVENTION

1. Field of the Invention

The present invention relates to radar systems and, more particularly, to Doppler radar systems for tracking targets in high clutter.

2. Related Art

Numerous Doppler radar systems including Doppler processing techniques are available. For example, U.S. Pat. No. 4,137,532 to Taylor, Jr. et al describes a Doppler radar system which has a variable interpulse period (VIP) filter bank to suppress echoes from terrain, rain and chaff. Each filter of the VIP filter bank suppresses a designated frequency band with a width being a large fraction of $1/T_{av}$ where $T_{av}$ is the average period between data samples. The VIP filter bank has seven individual filters. Filter numbers 1 and 7 respond to zero velocity echoes and numbers 2 through 6 provide for echoes having some velocity response. The VIP filter bank is preceded by an MTI canceller that is provided for canceling ground clutter by providing a deep symmetrical notch around zero Doppler frequency.

U.S. Pat. No. 4,622,552 to Andrews et al describes a Doppler processor which has a plurality of (N) transversal filters each of which are delayed by a delay circuit which delays a received signal by a time (T) which equals the interpulse period. The output of the Doppler processor is further filtered by a coherent integration filter to further reduce the level of the clutter components.

However, to date, no suitable method and device of tracking a target in clutter is available which effectively filters clutter from a reflected radar signal.

SUMMARY OF THE INVENTION

In accordance with the present invention, a method and a device is provided which effectively detects and tracks a target and filters clutter from a reflected radar signal. A feature of an embodiment of the present invention includes a method and a device which may identify a range extent of a cloud of clutter and calculate a centroid and growth rate of the cloud of clutter about the target in order to provide an effective filtering of the clutter from the reflected radar signal.

In accordance with one particular embodiment of the present invention, a method for discriminating and tracking a target in a clutter cloud comprises: transmitting a first radar signal at a first signal bandwidth for searching and locating a clutter cloud; transmitting a second radar signal at a second signal bandwidth to: identify a range extent of a clutter cloud; determine a centroid and a velocity growth rate of the clutter cloud; and identify a direction of movement of the centroid of the clutter cloud. The method may also comprise locking a third radar signal having a third signal bandwidth onto the centroid of the clutter cloud whereby the centroid is tracked within one radar range resolution bin; providing a delay line comprising at least two Doppler filters, the delay line may be configured to cover a Doppler frequency range corresponding to a velocity growth rate of the clutter cloud; and processing a reflected radar signal corresponding to the third signal bandwidth. The processing of the reflected radar signal may comprise passing the reflected radar signal through the delay line to mitigate a portion of the reflected signal that is reflected by the clutter cloud.

In accordance with another embodiment of the present invention, a radar system for tracking a target in a cloud of clutter may comprise a transmitter configured to selectively transmit a radar signal at a first radar bandwidth, at a second radar bandwidth, and at a third radar bandwidth. A receiver may be configured to receive a first reflected radar signal at the first radar bandwidth, a second reflected radar signal at the second radar bandwidth, and a third reflected signal at a third radar bandwidth. At least one processor may be interconnected with the receiver and the transmitter and may be configured to: locate a clutter cloud and target based on the first reflected radar signal; actuate the transmitter in order to lock the second radar signal at the second radar bandwidth onto the clutter cloud; identify a range extent of the clutter cloud and to calculate a centroid, a velocity growth rate and a direction of movement of the centroid of the clutter cloud based on the second reflected radar signal; actuate the transmitter in order to lock the third radar signal at the third radar bandwidth onto the centroid of the clutter cloud; provide a delay line comprising at least two Doppler filters, the delay line being configured to cover a Doppler frequency range corresponding to a velocity growth rate of the clutter cloud; and process the third reflected radar signal corresponding to the third radar bandwidth by passing the reflected radar signal through the delay line to mitigate a portion of the third reflected radar signal that is reflected by the clutter cloud.

In accordance with another embodiment, a processor for mitigating a clutter cloud in a reflected radar signal where the clutter cloud has a velocity growth rate may comprise an input for receiving a reflected radar signal and a delay line that comprises a plurality of moving target indicator (MTI) Doppler filters. The delay line may be configured to cover a Doppler frequency range corresponding to the velocity growth rate of the clutter cloud to mitigate a portion of a reflected radar signal that is reflected by the clutter cloud from the reflected radar signal. The processor also comprises an output connected in circuit with the plurality of MTI Doppler filters.

In accordance with a further embodiment, a method for discriminating and tracking a target in a clutter cloud comprises: transmitting a radar signal at a signal bandwidth to: identify a range extent of a clutter cloud; determine a centroid and a velocity growth rate of the clutter cloud; and identify a direction of movement of the centroid of the clutter cloud. The method may also comprise locking another radar signal having a greater signal bandwidth onto the centroid of the clutter cloud whereby the centroid is tracked within one radar range resolution bin; providing a delay line comprising at least two Doppler filters, the delay line being configured to cover a Doppler frequency range corresponding to a velocity growth rate of the clutter cloud; and processing a reflected radar signal corresponding to the greater signal bandwidth, the processing of the reflected radar signal comprising passing the reflected radar signal through the delay line to mitigate a portion of the reflected signal that is reflected by the clutter cloud.

In accordance with still a further embodiment, a radar system for tracking a target in a cloud of clutter comprises a transmitter that is configured to selectively transmit a radar signal at a first radar bandwidth and at a second radar bandwidth and a receiver that is configured to receive a first reflected radar signal at the first radar bandwidth and a second reflected radar signal at the second radar bandwidth. The system may also comprise at least one processor interconnected with the receiver and the transmitter that is configured to: identify a range extent of the clutter cloud and to calculate a centroid, a velocity growth rate and a direction of movement of the centroid of the clutter cloud based on the first reflected radar signal; actuate the transmitter in order to lock the second radar signal at the second radar bandwidth onto the centroid of the clutter cloud; provide a delay line comprising at least two Doppler filters, the delay line being configured to cover a Doppler frequency range corresponding to a velocity growth rate of the clutter cloud; and process the second reflected radar signal corresponding to the second radar bandwidth by passing the reflected radar signal through the delay line to mitigate a portion of the second reflected signal that is reflected by the clutter cloud.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

Figure 1:
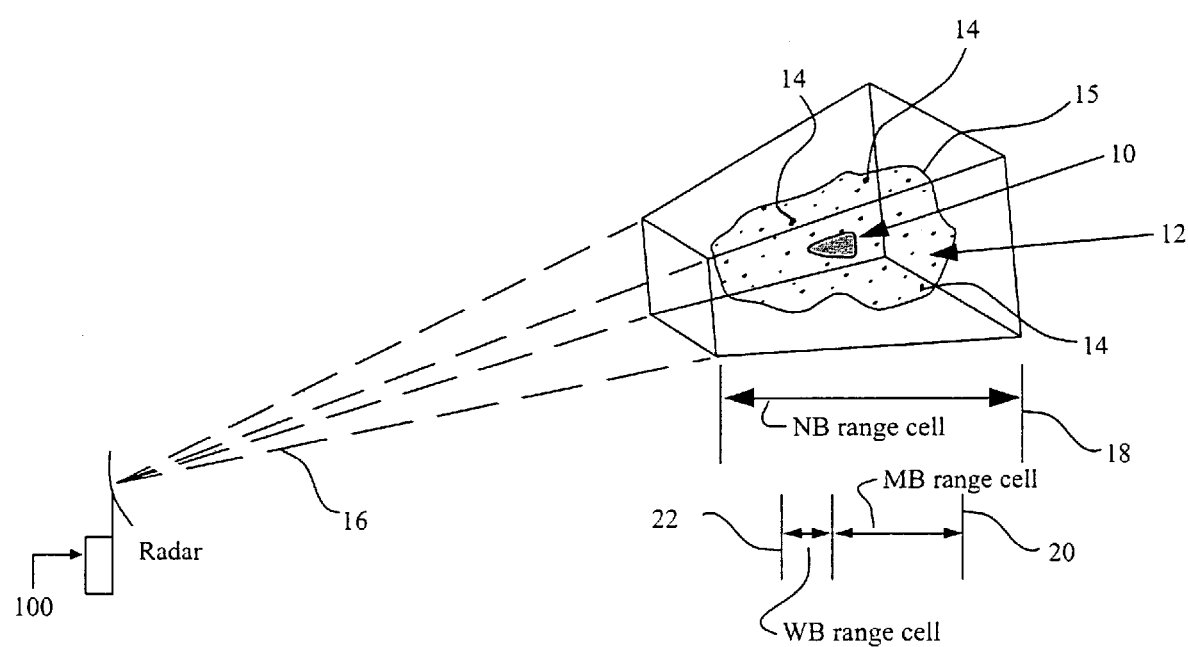
FIG. 1 is a diagram illustrating a target contained within a cloud of clutter which is, in turn, shown within a range cell of a radar system.

One embodiment of the present invention concerns a method and a device for detecting and tracking a target and mitigating clutter in a reflected radar signal. For example, referring now to FIG. 1, a target 10 is disposed within a cloud of clutter or clutter cloud 12. It will be understood that the target 10 may be any structure of interest such as an airplane or missile that is desired to be intercepted and may also include multiple structures of interest. The target 10 is not at rest and is moving at a particular relatively constant velocity (V) and the clutter cloud 12 has been released from the target or about the target by another vehicle (not shown). The clutter cloud 12 may be composed of clutter 14, such as one to ten million chaff dipoles that may be moving at a range of velocities which generally has been found to average approximately +/−0.9 meter per second (m/s) relative to a centroid velocity track of the clutter cloud. The clutter cloud 12 may be bounded by an outer edge 15.

A method for detecting and tracking a target and mitigating clutter in a reflected radar signal in accordance with the present invention includes the transmission of a radar signal 16 by a radar system 100. The radar system 100, which will be described in more detail below, may first transmit the radar signal 16 in order to search out and locate a clutter cloud 12 and target 10. For searching purposes, the radar signal 16 is transmitted at a narrow bandwidth, e.g., operating at frequencies that are in the range of from about 1 to about 3 Megahertz (MHz) which creates a narrow band (sometimes referred to below as "NB") range cell 18. It will be understood that the NB range cell 18 may be large enough to encompass the entire clutter cloud 12.

Accordingly, another radar signal (not shown) may be transmitted having a medium bandwidth (sometimes referred to below as "MB") having a range of from about 3 MHz to about 10 MHz and creating an MB range cell 20. The MB range cell 20 will encompass only a portion of the clutter cloud 12 and thus, by knowing the range cell size based on the bandwidth and the distance to the edge 15 of the clutter cloud 12, a range extent of the clutter cloud may be determined in a known manner. Also, by identifying a peak range bin of the reflected medium bandwidth signal, a centroid location (not numbered) of the clutter cloud 12 may be ascertained and, using range extent information over a number of radar pulses, a velocity growth rate and a velocity and direction of movement of the centroid may be further established in a known manner such as by varying a pulse repetition frequency (PRF) of a transmitted radar signal and by standard Kalman filtering techniques. While it is preferred that the range extent of the clutter cloud 12, a velocity growth rate and a velocity and direction of movement of the centroid may be determined using a radar signal transmitted at a medium bandwidth it will be understood that a narrow bandwidth may also be used in the practice of the present invention for this purpose.

A further radar signal (not shown) having a wide bandwidth (sometimes referred to below as "WB") of greater than approximately 10 MHz and creating a WB range cell 22 may then be transmitted toward the centroid of the clutter cloud 12 in order to locate and track the cloud centroid within one radar range resolution bin. Accordingly, the wide bandwidth radar signal will be locked onto a volume which includes the target 10 since the spatial focus of the radar signal will be narrowed to the location of the target 10. Once the radar signal is locked to the target and may track at the velocity of the target 10, the reflected signals from the clutter cloud, which moves at different velocities from the target, may be removed to reveal the target through Doppler filtering. It will also be appreciated that the portion of the reflected radar signal reflected by the target 10, after filtering, will be greater in amplitude than the portion reflected by the clutter cloud 12.

Figure 3:
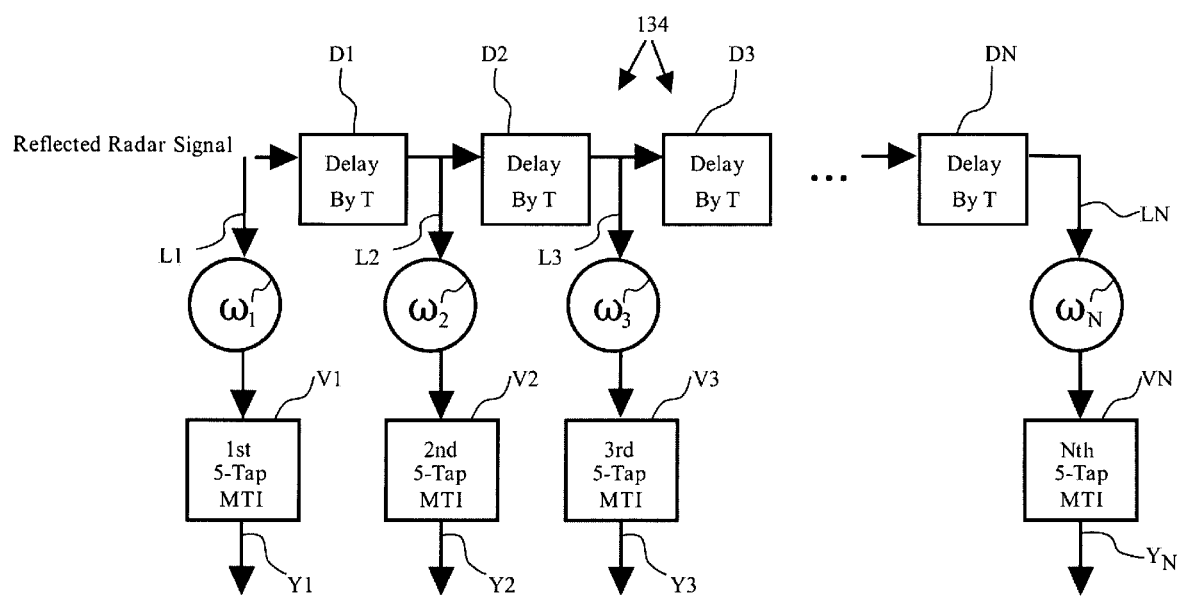
FIG. 3 is a diagram illustrating a delay line in accordance with the embodiment of FIG. 2.
Figure 4:
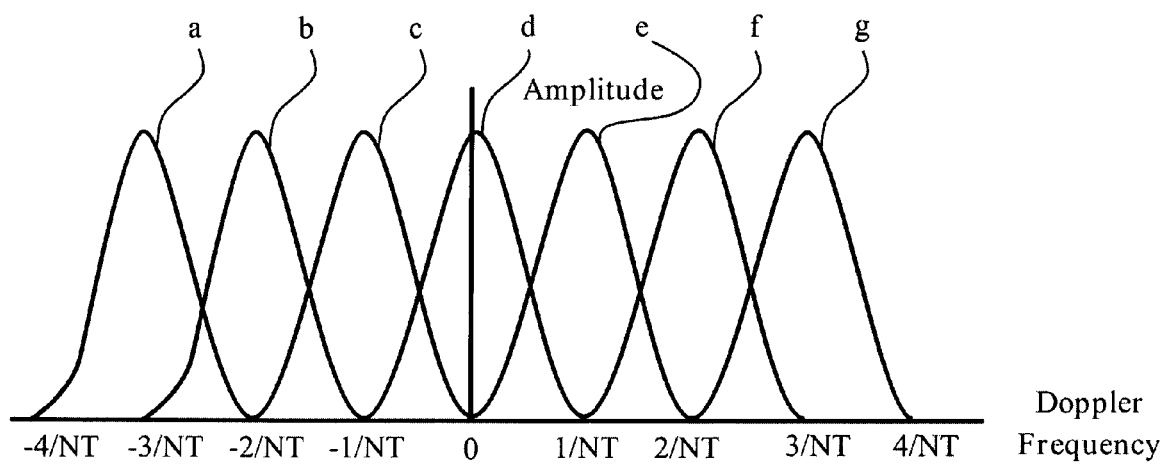
FIG. 4 is a frequency domain plot showing amplitude vs. Doppler frequency for the delay line of FIG. 3 where N=8.

It has been found that the most effective arrangement for mitigation of the clutter cloud 12 is use of a bank of (N) Doppler filters, described in more detail below in connection with FIG. 3, that are each provided to mitigate the portion of the reflected radar signal reflected by the clutter cloud 12. In particular, each of the Doppler filters is delayed by a time delay within a pulse rate frequency of the transmitted radar signal that is sufficient to cover a particular Doppler frequency corresponding to the various velocities of the clutter 14 in the clutter cloud 12. Referring now also to FIG. 4, a series of notches (a–g) that are output from a bank of Doppler filters, where N=8, is illustrated. Since, as described above, the centroid of the clutter cloud 12 is being tracked, movement of the centroid corresponds to a Doppler frequency of zero and movement of the clutter 14 corresponds to a Doppler frequency somewhere above and below that of zero. Accordingly, the series of notches (a–g) are provided for mitigating the portion of the reflected radar signal which is reflected by the clutter 14.

Figure 2:
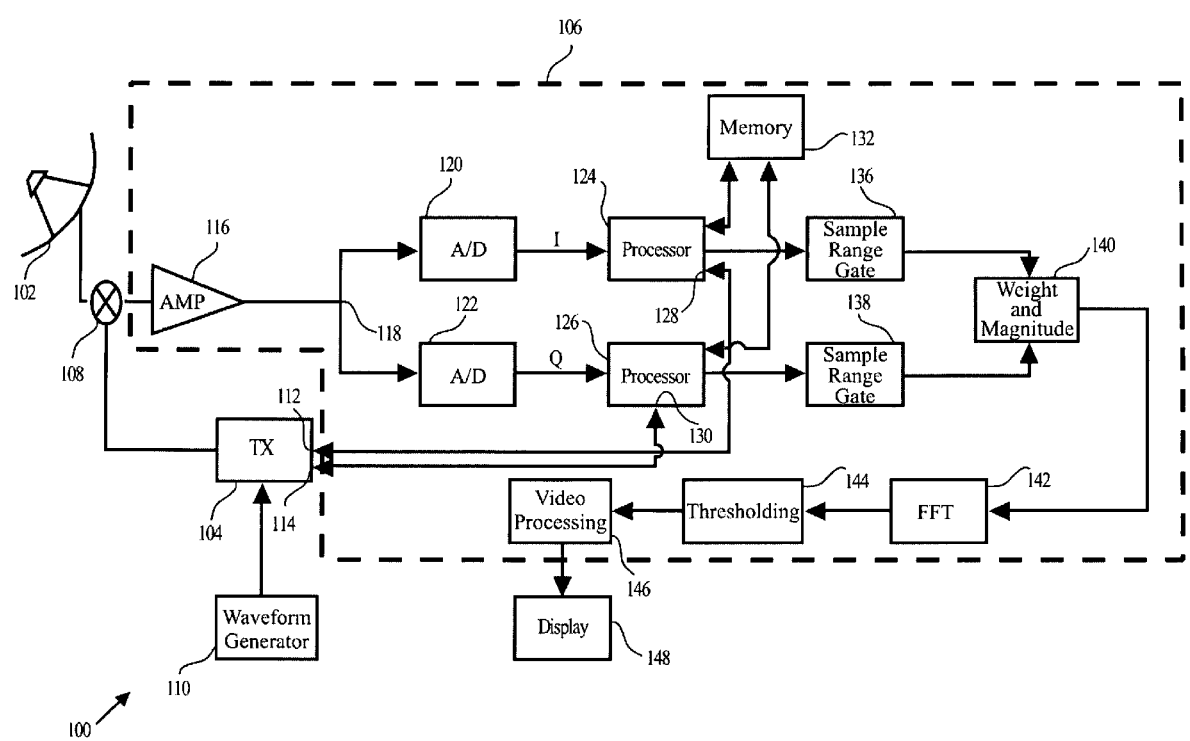
FIG. 2 is a diagram illustrating a radar system for detecting and tracking a target in clutter in accordance with one embodiment of the present invention.

Referring now to FIG. 2, a radar system that is capable of functioning as described in accordance with the above embodiment of the present invention is illustrated generally at 100. The radar system 100 may comprise an antenna 102, a transmitter 104 and a receiver 106. The antenna 102 may be any suitable type, including a phased array and may be connected in circuit with a circulator 108 which maintains separate pathways for the transmitter 104 and the receiver 106 in a known manner. The transmitter 104 generates a radar signal based on input from a waveform generator 110 for transmission by the antenna 102 and communicates with the receiver 106 as described below via ports 112 and 114.

The receiver 106 receives a reflected radar signal and may comprise an amplifier 116 which is connected in circuit with a splitting junction 118. The latter may include a quadrature phase detector for splitting the reflected radar signal into respective I and Q channels for passage to the analog to digital converters 120, 122 in a known manner. Once the reflected radar signal has been converted into a digital word, processors 124, 126, may be employed to process the reflected radar signal and communicate with the transmitter 104 via ports 128, 130 for effecting tracking and bandwidth changes as described above.

The processors 124, 126 communicate with a memory 132 in a known manner and may be configured, e.g. programmed using software or firmware, to effect processing of a reflected radar signal such as is described above including, among other things, calculating a velocity growth rate of the clutter cloud 14 and direction and velocity of movement of the centroid of the clutter cloud. In addition, referring now also to FIG. 3, the processors 124, 126 may be configured, e.g. through software or firmware, to create a bank 134 of Doppler filters to effect a transversal processing of the reflected radar signal, as described above. In particular, the bank 134 of Doppler filters comprise a plurality of Doppler filter lines $L_1, L_2, L_3 \ldots L_N$ which are separated by delays $D_1, D_2, D_3 \ldots D_N$. Each of the filter lines may comprise a weight $\omega_1, \omega_2, \omega_3 \ldots \omega_N$ and a filter $V_1, V_2, V_3 \ldots V_N$, such as a six pulse or five tap moving target indicator (MTI), as illustrated. It will be understood that while a five tap MTI is preferably employed in the practice of this invention other MTI filters including two, three or four tap MTI filters may be employed depending upon the application. Further details of an MTI filter may be found in U.S. Pat. No. 3,560,972 to Taylor, Jr. which is hereby incorporated herein by reference to the extent necessary to make and practice the present invention. An example of an output provided from a bank 134 via lines $Y_1, Y_2, Y_3 \ldots Y_N$ is shown graphically in FIG. 4. In particular, where N=8 and depending on the time period of each delay $D_1$ through $D_8$, each of the Doppler filter lines $L_1$ through $L_8$ provides a notch a–g. Further Details of the MTI filters and Doppler filter lines in general may be found in "Introduction to Radar Systems" by Merrill I. Skolnik, 1980, McGraw-Hill, Inc. and U.S. Pat. No. 4,622,552 to Andrews et al which are both hereby incorporated herein by reference to the extent necessary to make and practice the present invention.

Referring again to FIG. 2, output from the processors 124, 126 is conducted to sample range gates 136 and 138 which function to identify and separate particular range resolution cells of the reflected radar signal that are to be subject to Fourier analysis.

After passage through the sample range gates 136, 138, a weight and magnitude of the reflected radar signal may be carried out at 140 in a known manner whereby the I and Q channels recombine. The phase of the reflected pulse may be obtained by taking the inverse tangent of I/Q. The reflected radar signal may then be subjected to a fast Fourier transform (FFT) algorithm at 142 to provide Doppler filtering for each range gated pulse in order to resolve the spectrum into its harmonic components. In order to adequately satisfy sampling constraints, it is recommended that the FFT size be greater than or equal to the expected range of positive and negative Doppler frequencies. As is common practice, zero padding up to the next power of two will provide a better implementation of the FFT. For example, a 256 point FFT is suitable to cover a 240 Hz pulse rate frequency of the radar transmitter 104. Thresholding and video processing of the reflected radar signal may then be carried out in a known manner at 144, 146 so that the signal may be displayed at 148.

EXAMPLE

It is desired to detect and track a centroid of a clutter cloud 12 having ten million dipoles of chaff occupying a one-kilometer range extent. Since there is a normal distribution of chaff dipoles, approximately 67% of the chaff dipoles occupy 333 meters of range extent. Using a nominal PRF of 10 Hz and a pulse length of eight milliseconds, NB track of the cloud can be initiated. The cross section (C/S) of each dipole of chaff may be calculated from the formula:

$$Drcs = 0.18 N \lambda^2$$

In this case, one NB range bin contains approximately:

$$Drcs = 0.18(670,000)(0.03)^2$$

$$Drcs = 108.54 \text{ or approximately 20 dBsm}$$

Where: N=(0.67)(1,000,000), λ=0.03m (nominal X-band radar wavelength) and Drcs is the combined radar cross section of the dipoles that reside in the NB resolution cell.

Given that for an eight milliseconds pulse width the single pulse minimum rms track error ($F_e$) is about 8 Hz, at X-band, a single pulse velocity error ($V_e$) of 0.12 meters per second (m/s) results ($V_e=[F_e*\lambda]/2$). Accordingly, a wideband (WB) centroid track accuracy of better than 0.12 m/s is attainable. When there is a relative dipole velocity ($V_r$) of +/−0.9 m/s, a minimum PRF of 240 Hz (2*4*0.9/0.03) results for the WB waveform (note that in order to meet Nyquist sampling criteria: PRF >=2*$F_d$; $F_d$=2*$V_r$/λ=2*1.8/0.03=120 Hz; therefore, minimum PRF=2*$F_d$=240 Hz.

Accordingly, a bank of Doppler MTI filters may be created to cover 240 Hz of frequency extent. As described above, an FFT having a 256 range bins is suitable for this frequency extent. Therefore, each MTI filter will contain approximately 1/256 of the total dipole velocities or about 0.03 m/s of velocity of dipoles per MTI filter and an estimate of the Signal to Clutter (S/C) improvement now may be found to be 24 dB based on 10 log (1/256). This improvement is beyond that of the improvement offered by any additional filtering within the Doppler frequency bin. Since, for this example, the clutter amplitude is much larger than that of the noise, it has a higher clutter signal contribution within the range bin. The 24 dB S/C improvement is represented by the 256 Doppler Bins on the y axis. For example, if Doppler frequency was not measured, all of the clutter residing in the range bin would compete with the target. Use of Doppler frequency reduces the amount of clutter competing with the target which resides in one range-doppler bin by, e.g., a factor 1/256 (24 dB).

Figure 5A:
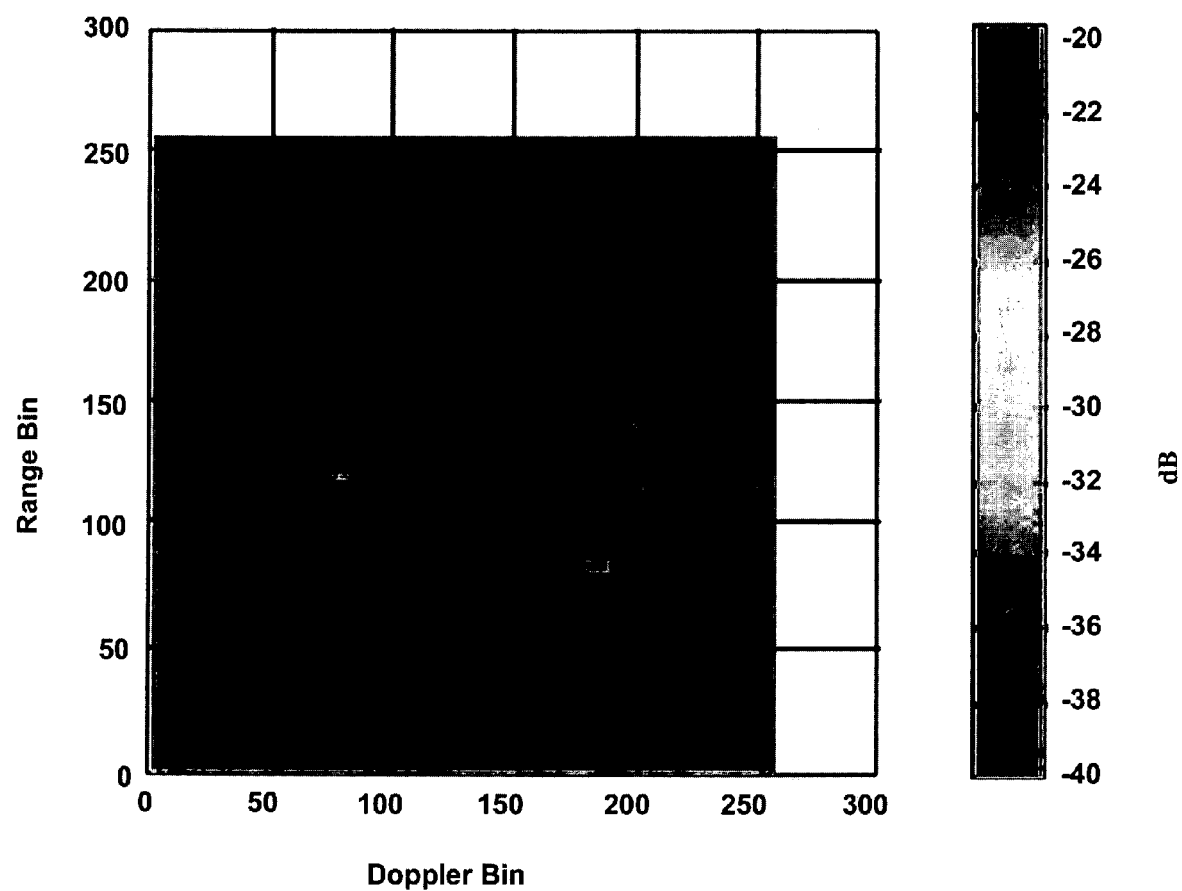
FIGS. 5a–5c are a series of plots showing first no processing of a reflected radar signal, next processing of a reflected radar signal with a coherent integration routine and finally processing of a reflected radar signal in accordance with the embodiment of FIG. 2.
Figure 5B:
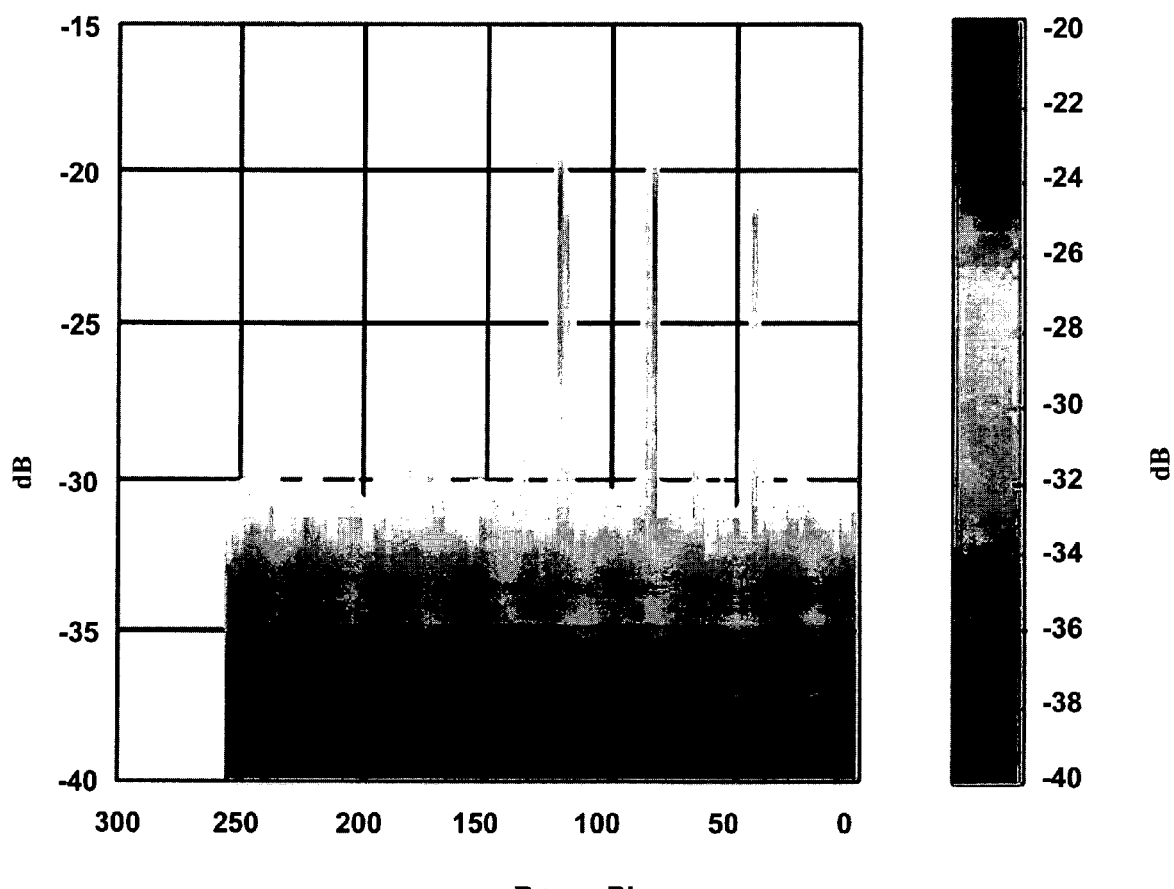
Figure 5C:
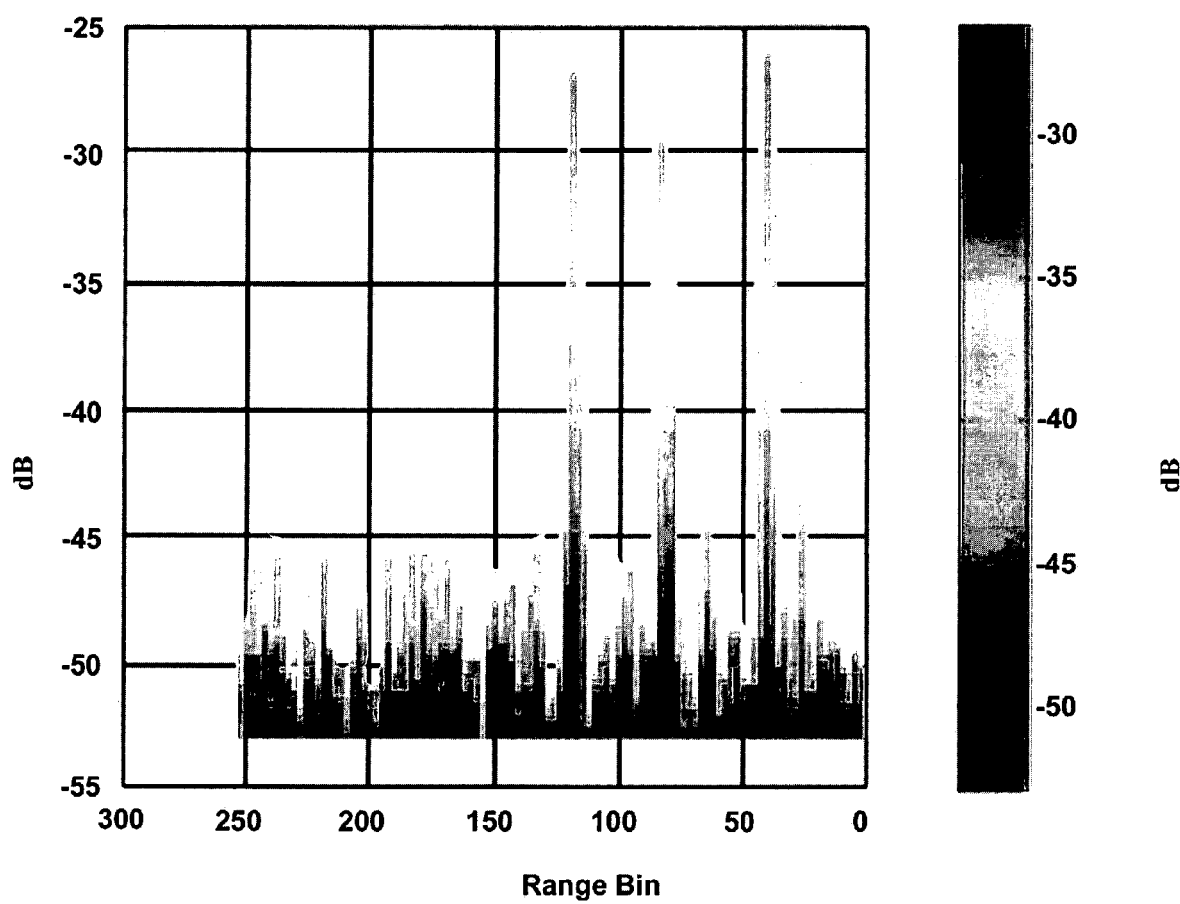

Referring now to FIGS. 5a–5c, a sequence of plots are provided which show the improvement in signal to noise ratio in employing the present embodiment in the presence of varying levels of white noise. In this case, there were three targets with an approximate S/C of 6–7 dB after applying a 256 point FFT, as shown in the range-doppler plot in FIG. 5a, and the companion magnitude vs. range plot in FIG. 5b. After applying a bank of MTI Doppler filters, a 7–9 dB improvement above that of conventional range-doppler imaging results as shown in the magnitude vs. range plot in FIG. 5c. It will be appreciated that varying the PRF over time will make a difference in the MTI filter signal to clutter (S/C) improvement, since the target velocity may not be at the MTI filter's maximum gain.

OPTIONAL EMBODIMENT

Figure 6:
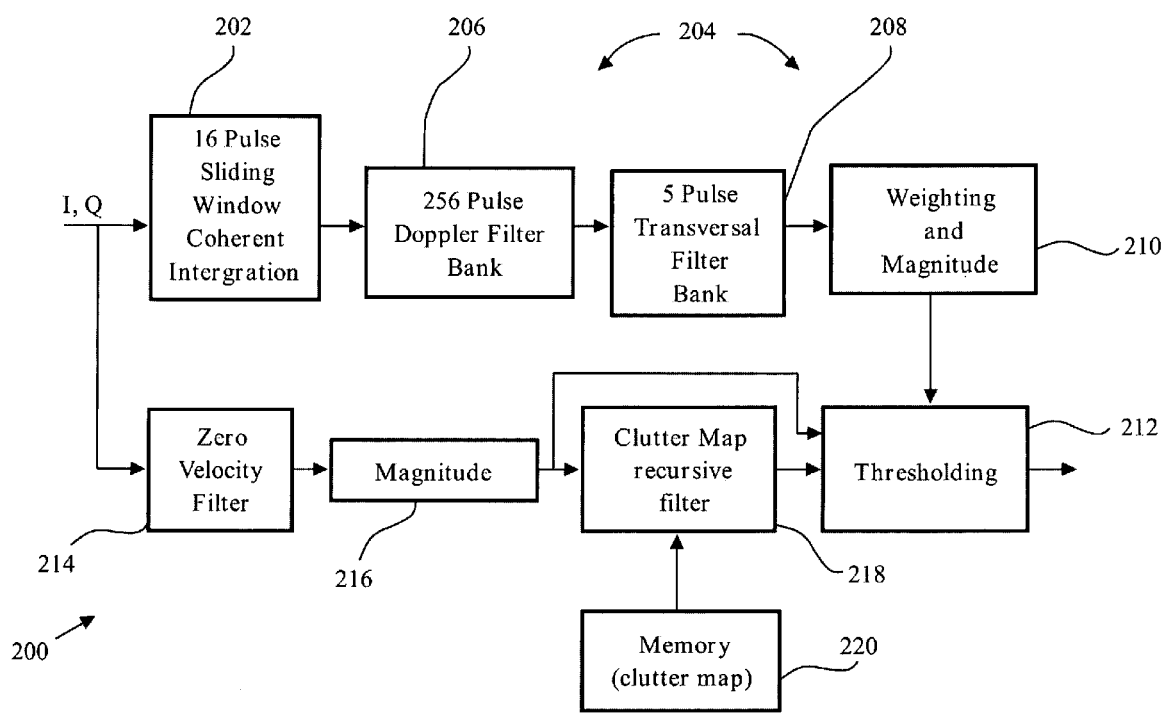
FIG. 6 is a block diagram showing an optional embodiment of an arrangement for processing a reflected radar signal in accordance with the present invention.

Referring now to FIG. 6, an optional embodiment of a method and device for processing a reflected radar signal in accordance with the present invention is illustrated generally at 200. In this particular embodiment, integration at 202 is carried out on a reflected radar signal prior to filtering the signal in a manner which may be similar to the filtering arrangement described in the embodiment above and shown generally at 204. The integration 202 preferably comprises a sixteen pulse sliding window coherent integration which is known to one of ordinary skill in the art and further details of this technique may be found in the discussions of prediction integration in the book "Introduction to Radar Systems" previously incorporated herein by reference. It will be appreciated that the sixteen pulse integrator provides an additional boost in S/C which may be necessary to further increase the S/C where clutter is extensive, particularly where a single pulse S/C is negative It has been found that use of the integration 202 in addition the filtering arrangement shown at 204 may provide a twelve dB improvement in S/C ratio which would allow for the detection of targets having a single pulse reflected radar signal of −5 to −7 dB (S/C).

The filtering arrangement 204 comprises a 256 pulse FFT Doppler filter bank 206 and a five tap MTI transversal filter bank 208. The FFT filter bank 206 is preferably similar to the FFT 142 (FIG. 2) which is described above and the filter bank 208 is preferably similar to the filter bank 134 (FIG. 3) and is also described above. While in the present embodiment the reflected radar signal is processed by FFT filter bank 206 prior to processing in the filter bank 208, it will be appreciated that variation in order of processing will not significantly vary the improvement in S/C. Also, both a weighting and magnitude 210 and thresholding 212 may be carried out similar to that described above in connection with FIG. 2.

For eliminating further clutter in a reflected radar signal, a known zero velocity filter 214 may also be employed as a parallel processing of the signal in the practice of the present embodiment. A magnitude 216, clutter map recursive filter 218 and a memory 220 for retaining the time varying clutter map statistics may also be employed. This zero velocity filter clutter map is particularly advantageous in that it adaptively estimates the clutter contributions over time (and near DC where the clutter contribution is the strongest) and sets the processor threshold adaptively to maintain a constant false alarm rate as is common practice in many radar applications.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A processor for mitigating a clutter cloud in a reflected radar signal, the clutter cloud having a velocity growth rate, the processor comprising:
   an input for receiving a reflected radar signal;
   a delay line comprising a plurality of moving target indicator (MTI) Doppler filters, the delay line being configured to cover a Doppler frequency range corresponding to the velocity growth rate of the clutter cloud, the reflected radar signal passing through the delay line to mitigate a portion of the reflected radar signal that is reflected by the clutter cloud from the reflected radar signal; and
   an output connected in circuit with the plurality of MTI Doppler filters.

2. The processor of claim 1, wherein the delay line comprises (N) time delay circuits interspersed between (N) MTI Doppler filters and wherein a time delay of each of the time delay circuits is (1/N) of the pulse repetition frequency period.

3. The processor of claim 2, wherein N=8 and wherein each of the Doppler filters comprises a five tap moving target MTI filter.

4. The processor of claim 1, wherein the delay line comprises a plurality of time delay circuits interspersed between the plurality of MTI Doppler filters each being delayed by the pulse repetition frequency period.

5. The processor of claim 1, wherein the at least one Doppler filter comprises at least one n-tap moving target indicator (MTI) filter where n is in the range of from 2 to 5.

6. The processor of claim 1, wherein the processor is further configured to perform a fast Fourier transform of the reflected radar signal.

7. The processor of claim 1, wherein the processor is further configured to perform a sliding window coherent integration routine on the reflected radar signal.

8. The processor of claim 1, wherein the processor is further configured to include a zero velocity filter and memory to create an adaptive clutter map that is used to adjust the threshold over time as is commonly done to achieve constant false alarm rates in conventional radar signal processors.

* * * * *